Feb. 11, 1936.   J. W. WHITE   2,030,340
HYDRAULIC BRAKE SYSTEM
Filed Nov. 8, 1923
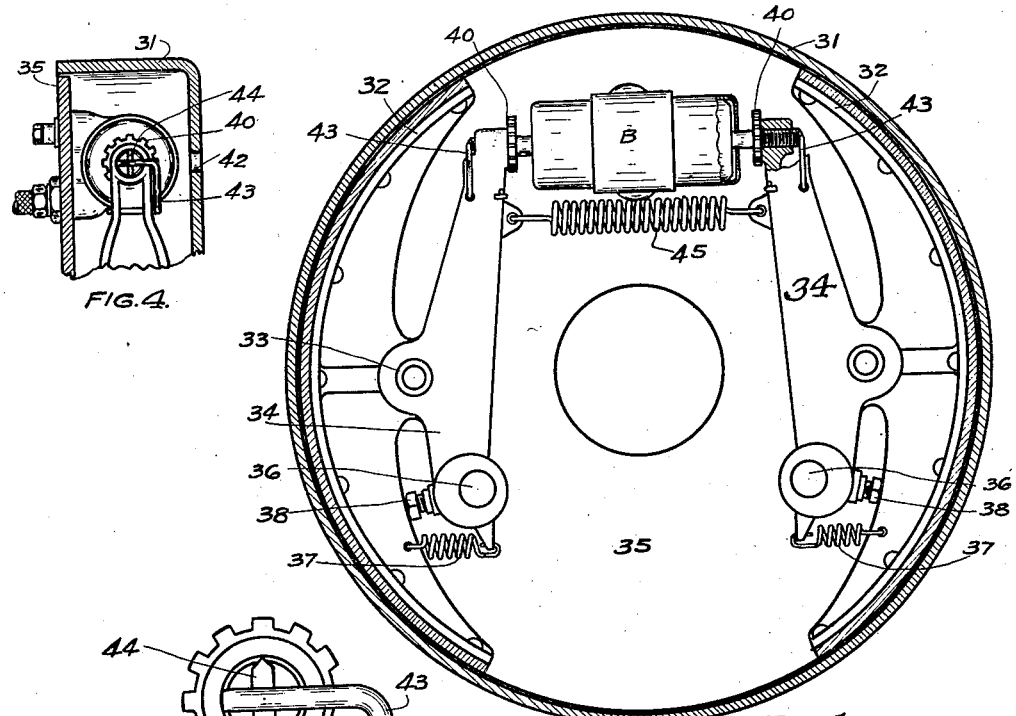
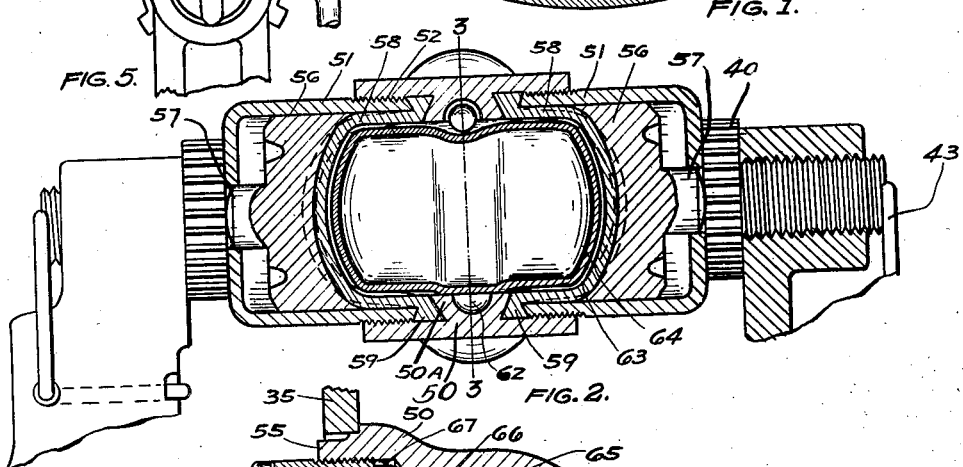
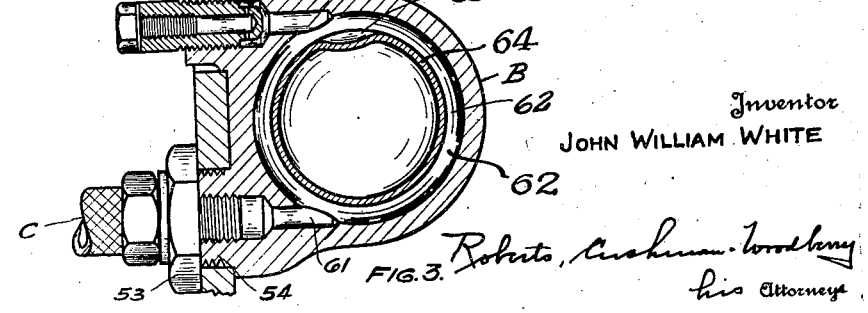
Inventor
JOHN WILLIAM WHITE
his Attorneys Patented Feb. 11, 1936

2,030,340

UNITED STATES PATENT OFFICE 2,030,340

HYDRAULIC BRAKE SYSTEM

John William White, Buffalo, N. Y., assignor, by mesne assignments, to General Motors Corporation, a corporation of Delaware Application November 8, 1928, Serial No. 317,933

3 Claims. (Cl. 188—152)

The invention relates to improvements in hydraulic brake system and has particular reference to the hydraulic unit for directly actuating the brake applying means. The invention therefore consists in certain novel features in this construction as hereinafter set forth.

My improvements are applicable to various constructions of brake mechanisms but as shown in the accompanying drawing Fig. 1 is a sectional elevation of an internal brake mechanism to which my improved unit is applied;

Fig. 2 is a longitudinal section through the unit and associated parts;

Fig. 3 is a cross section taken on line 3—3 of Fig. 2;

Fig. 4 is an end elevation showing the way of securing the adjusting means in position, and Fig. 5 is a view of certain details of the mechanism shown in Fig. 4.

While certain features of my invention are as above stated applicable to various constructions of brake applying means, I have specifically illustrated an internal brake in which 31 is a brake drum of the usual type and acting upon brake shoes 32 to bring them into contact with the drum. The brake shoes 32 are pivotally connected at 33 to brake levers 34 which are pivoted to the brake flange 35 by studs 36 fixed to the flange. The levers 34 are normally held in position by springs 37, the inner limits being determined by set screws 38.

Mounted in one end of each of the brake levers 34 is an adjusting screw 40 threaded in the end of the lever. The head of each screw 40 has a knurled periphery by which the screw can be rotated in order to adjust its relation to the lever 34. Preferably there are provided in each brake drum casing openings 42 through which a screw driver or other suitable tool can be introduced in order to engage the knurled periphery and rotate the screw 40 in the desired direction. However, an opening (not shown) can be provided in the brake flange 35 if desired to accomplish the same purpose. The screw 40 is normally held in position by a heavy spring wire 43 which engages notches 44 in the outer end of the screw 40 and which is suitably mounted upon the lever 34. The brake levers are normally yieldably held with the heads of the screws 40 in contact with a cylinder B by a spring 45, as shown in Fig. 1.

Each brake cylinder B comprises a side wall 50 and a pair of cup-like end walls 51 having threaded engagement 52 with the side wall 50. The cylinder is mounted upon the brake flange 35 by means of a nut 53 which engages an externally threaded projection 54 from the side wall 50 and is positioned thereon by the projection 54 and by a second projection 55. The projections 54 and 55 pass through suitably located holes in the brake flange 35 so that they act as dowels to locate the cylinder (see Fig. 3). The side wall 50 and the end walls 51 together define a compartment which encloses and serves to limit the movement of the working elements of the cylinder B, described hereinbelow.

The working elements will now be described. Mounted to reciprocate within this compartment are pistons 56 each provided with a centrally located finger 57 which projects through an opening in an end wall 51 into contact with the head of the screw 40. The fingers 57 slidably engage the walls of the apertures and thus act as seals to prevent the entry of dirt, dust, grit or other material. Within the compartment and bearing against the inner faces of the pistons 56 are a pair of flexible cups 58. These cups 58 are secured in position in the compartment by means of wedge shaped flanges 59 at the mouths of the cups, which flanges are clamped between a ring 50A formed on the inner face of the side wall 50 and the inner edges of the cup-like end walls 51. The end walls 51 being in threaded engagement at 52 with the side wall 50 act by their conformation (see Fig. 2) to hermetically seal the cups 58. It will be further noted that the application of fluid pressure to the walls of the cups as described later tends to increase the clamping of the flanges and in case the seal is not absolutely perfect makes it so and in that respect the cups are self-sealing.

The fluid conduits C enter each brake cylinder B through an inlet passageway 61 formed in the projection 54. In the band 50A of the side wall 50 is provided an annular groove 62 into which the inlet 61 leads. The cups 58 being, as previously pointed out, firmly anchored in the compartment at their peripheries by the flanges 59, thus define a chamber 63 having movable walls formed by the flexible cups 58 and the rigid side wall 50. In order to reduce the amount of fluid necessary to fill the chamber 63, a filler 64, preferably made of pressed steel material, may be introduced. This filler 64 is provided at the top with a depression 65 which connects with the groove 62 and thus facilitates the filling of the chamber 63 around the filler 64. Through the projection 55 extends a passageway 66 which enters the groove 62. This passageway is normally closed by a valve 67 which is opened when necessary to permit the escape of air and insure the complete filling of the chamber.

It will be noted with the construction above described that the hydraulic unit B is rigidly mounted upon the flange 35 or brake carrier and that the end walls of the cupped cylinders 51 form stops for limiting retractile movement of the braking means. Also that the ends of said cupped cylinders form stops for limiting the outward movement of the pistons 56.

An important feature of the construction is that the flexible cups 58 are not subjected to stresses localized at any one point. This is due to the fact that the pistons 56 have their inner ends concave in form so that the flexible cups 58 will exactly conform to the side walls of the cylinders 51 and the end wall of the piston without leaving any part unsupported. When fluid under pressure is introduced through the conduit C the first effect will be to press the central portions of the cups 58 outward, moving the pistons 56 outward therewith and to also press the sides of the cups 58 against the side walls of the cylinder 51. As the cups 58 are not of an exact spherical form the portions thereof intermediate said central end portion and cylindrical side portions will be slightly retracted from contact with the piston 56 due to the inherent tension in the flexible material with the result that scuffing or abrasion of the outer surface of said cup will be avoided and permitting the cup to stretch longitudinally under uniform tension. Finally, when further outward movement of the piston 56 is prevented by contact of the brake shoes 32 with the drum 31, the increased fluid pressure due to this resistance will force all portions of the flexible cup 58 into conformity with the surfaces of the cylinder 51 and piston 56, and this will have a cushioning effect in the operation of the brake pedal through which the fluid pressure is developed.

The member 50 may be conveniently attached to the brake carrier 35 through the lugs 54 and 55 passing outward through apertures in said carrier and the fact that the fluid inlet passage 61 is through the lug 54 simplifies connection with the supply conduit C which is external to the brake drum. Also the valve 67 located in the lug 55 may be opened or closed from outside the brake drum.

The finger 57 on the piston 56 not only serves to transmit the thrust of said piston to the brake shoe but also in cooperation with the apertured end wall of the cupped cylinder 51 forms a guide for said piston.

I claim:

1. In a brake mechanism, a brake drum and cooperating means together forming an enclosure, brake friction means therein, an hydraulic actuator for said brake friction means, an adjustment means between said hydraulic actuator and brake friction means including a revoluble member peripherally notched to be engageable with and operable by a screw driver or like tool, said enclosure being apertured for the insertion of said tool.

2. In a brake mechanism, a brake drum and cooperating means together forming an enclosure, brake friction means therein, an hydraulic actuator for said brake friction means, an adjustment means between said actuator and brake friction means including a revoluble member peripherally notched to be engageable with and operable by a screw driver or like tool, said enclosure being apertured for the insertion of said tool, and a cooperating non-revoluble member having a screw threaded engagement with said revoluble member.

3. In a brake mechanism, a brake drum and co-operating means together forming an enclosure, brake friction means therein, an hydraulic actuator for said brake friction means and adjusting means between said actuator and said brake friction means, including a threaded socket on said brake friction means, a threaded stud for engaging said socket provided with a head bearing against said actuator and peripherally notched to be engageable with and operable by a screw driver or like tool, said enclosure being provided with a small aperture for the insertion of said tool.

JOHN WILLIAM WHITE.